United States Patent
Desenclos et al.

[11] Patent Number: 6,009,771
[45] Date of Patent: Jan. 4, 2000

[54] CHAIN SWITCHING DEVICE FOR BICYCLES

[75] Inventors: Christian Desenclos, L'Heure, France; Arndt Gockisch, Würzburg, Germany; Marcus Auer; Raymond Florczyk, both of Schwebheim, Germany

[73] Assignee: SRAM Deutschland GmbH, Schweinfurt, Germany

[21] Appl. No.: 09/024,693

[22] Filed: Feb. 17, 1998

[30] Foreign Application Priority Data

Feb. 17, 1997 [DE] Germany ............. 197 06 156

[51] Int. Cl.[7] ...................................... F16H 9/00
[52] U.S. Cl. .................. 74/502.4; 474/80; 474/82
[58] Field of Search .................. 74/502.4, 502.6; 474/80, 82, 78, 69, 119, 122, 127; 280/260, 261

[56] References Cited

U.S. PATENT DOCUMENTS

| | | | |
|---|---|---|---|
| 4,078,444 | 3/1978 | Huret | 474/80 |
| 4,199,997 | 4/1980 | Isobe | 280/236 |
| 4,226,130 | 10/1980 | Isobe | 474/82 |
| 4,237,743 | 12/1980 | Nagano | 474/82 |
| 4,330,137 | 5/1982 | Nagano | 280/238 |
| 4,543,078 | 9/1985 | Coue | 474/82 |
| 4,778,436 | 10/1988 | Nagano | 474/80 |
| 5,104,358 | 4/1992 | Kobayashi | 474/82 |
| 5,246,405 | 9/1993 | Nagano | 474/801 X |
| 5,779,581 | 7/1998 | Fujii | 474/82 |
| 5,846,148 | 12/1998 | Fujii | 474/80 |

*Primary Examiner*—Vinh T. Luong
*Attorney, Agent, or Firm*—Cohen, Pontani, Lieberman & Pavane

[57] ABSTRACT

A device for switching a chain on different sprockets of a pedal bearing mounted to a seat tube of a frame of a bicycle. The chain switching device includes a cage which can be economically manufactured in a plurality of constructions and readily mounted on different bicycle frames with different angles between a seat tube and a chain brace in order to achieve optimum operating angles with appropriately modified cages. The different cage constructions are manufactured from a single sheet metal blank and have brackets arranged at different positions and of different lengths which are formed by appropriately positioning their bending edges to attach the cage to a parallel guide device.

5 Claims, 4 Drawing Sheets

CHAIN SWITCHING DEVICE FOR BICYCLES

BACKGROUND OF THE INVENTION

1. Field of the Invention

The present invention is directed to a chain switching device, and in particular for sprockets on the pedal bearing of a frame for a bicycle.

2. Description of the Related Art

U.S. Pat. No. 4,330,137 discloses an arrangement of a chain switching device on the frame of a bicycle which has a cage for guiding and for switching a bicycle chain, wherein the cage is arranged on a parallel guide device connected with the frame by means of a fastening part. As described in the patent, the fastening part is not fastened to the seat tube as is customary, but rather is fastened to the pedal bearing housing, wherein any position of the cage relative to the chain can be achieved by rotating the fastening part. Because of the design of the cage, optimum alignment of the adjusting ring of the cage to the pull portion or traction portion of the chain running on the sprockets is required. Exact alignment is made possible by swiveling the fastening part that is rotatably fastened to the pedal bearing. Defect-free operation is realized in this manner, however, at the expense of a relatively complex construction of the chain switching device that is only mountable on frames having a specially designed pedal bearing housing adapted to the new mounting conditions of the fastening part of the chain switching device. Thus, it is possible to mount this chain switching device only in frames which are designed during manufacture for the mounting of the chain switching device.

It is therefore the object of the invention to provide a chain switching device for a chain such that a plurality of chain switching devices can be produced with a constant number of parts. In addition, it is desirable to develop chain switching devices which can be mounted in each instance at the seat tube in an angular area relative to the chain that is optimum for operation at a variety of angles between a seat tube at which this chain switching device is mounted and a chain brace whose position relative to the chain remains constant regardless of the frame construction.

SUMMARY OF THE INVENTION

The present invention is directed to a chain switching device including a fastening device that is fastened to the seat tube of the frame. The chain switching device also includes a parallel guide device that is connected to the fastening part with a base and a cage selected from one of two different constructions that is arranged and connected to the base so as to take into account different angles with respect to the traction portion of the chain. According to the invention, the cage is selected from one of two different constructions either of which can be manufactured from a single sheet metal blank, wherein the brackets used to connect the cage to the base of the parallel guide device has different positions depending on the particular cage construction. In particular, a first bracket and a second bracket are bent at different angles in different lengths so that joint bore holes and guide bore holes can be arranged depending on the adjusting angle of the respective cage relative to the traction portion of the chain. The entire area of possible angle of inclination of the seat tube relative to a chain brace in the frame constitutes an angle of approximately 6°. It is advantageous to use two different cage constructions to cover the entire area of the possible angle of inclination, that is, a first cage construction with an arrangement of its two brackets to accommodate the first 3° of possible angle of inclination and a second cage construction with the arrangement of its brackets able to accommodate the second 3° of possible angle of inclination.

The present inventive chain switching device is particularly suitable for sprockets on a pedal bearing for mounting on a set tube of a frame of a bicycle. According to the invention, the chain switching device includes a parallel guide device and a cage selected from one of a first cage construction and a second cage construction for guiding and switching a chain. The cage includes a first bracket with a joint bore hole and a second bracket with a joint bore hole and a guide bore hole for fastening the cage at the parallel guide device. Depending on the construction type of the frame, the seat tube has an angular area relative to a chain brace with a first angular area of approximately 66° to 69° and a second angular area of approximately 63° to 66°. The first cage construction for the first angular area has a first adjusting angle relative to its swivel fastening axis, whereas the second cage construction for the second angular area has a second adjusting angle relative to its swivel fastening axis in order to compensate for the adjustments of the respective cage relative to the traction portion of the chain caused by the two angular areas.

In a preferred embodiment, the cage regardless of whether formed according to the first or second construction is formed from an individual sheet metal blank such that the first bracket of the first cage construction has a first bending edge, the second bracket of the first cage construction has a second bending edge, the first bracket of the second cage construction has a first bending edge, and the second bracket of the second cage construction has a second bending edge.

Furthermore, an angular difference between the adjusting angle of the first cage construction relative to the adjusting angle of the second cage construction is approximately 3° and corresponds to the difference between the first angular area and the second angular area. In addition to the adjusting angle difference between the two different cage constructions, the position of the second cage construction is preferably displaced in the movement direction relative to the base. This displacement is achieved by shifting the first bending edge of the second cage construction relative to the first bending edge of the first cage construction toward the center of the sheet metal blank and by shifting the second bending edge of the second cage construction relative to the second bending edge of the first cage construction away from the center of the sheet metal blank.

In addition, the cage is preferably connected to the parallel guide device by arrangement of a joint bore hole in the first bracket, a joint bore hole in the second bracket axially aligned with the joint bore hole in the first bracket, and a guide bore hole in the second bracket, wherein the geometric position of the joint bore hole and the guide bore hole in the second bracket relative to one another remains constant.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

Figure 1:
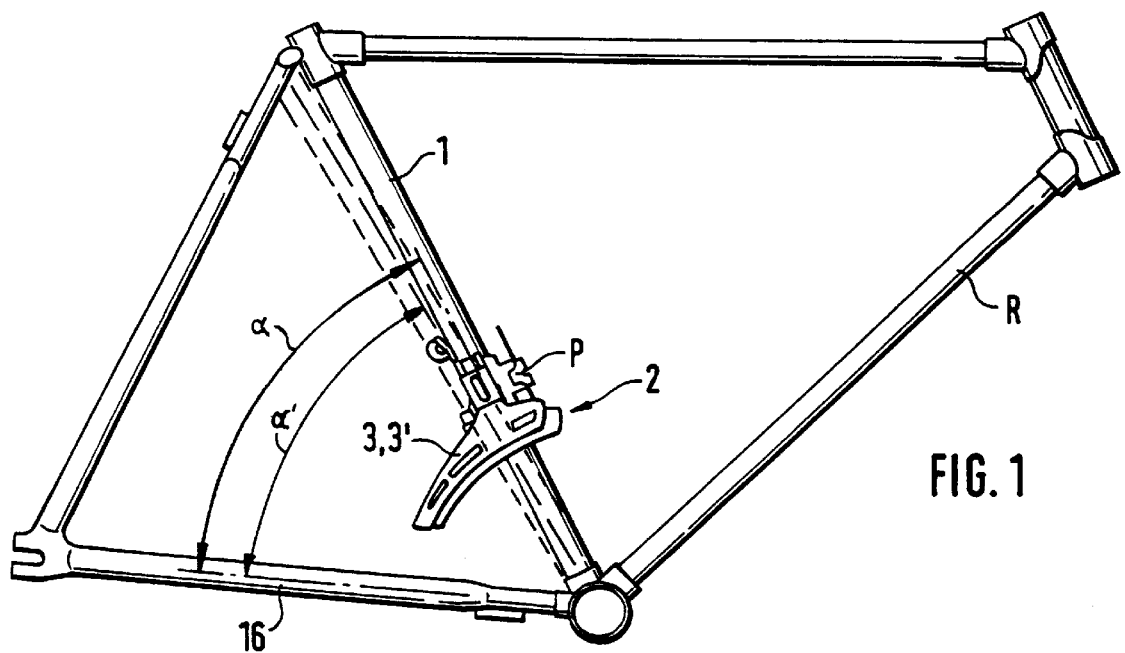
FIG. 1 shows a frame of a bicycle with a chain switching device in accordance with the present invention including a cage selected from one of two different cage constructions and a parallel guide device.

In FIG. 1, a bicycle frame, designated by R, has a seat tube 1 to which is fastened a chain switching device 2 which includes a parallel guide device P and a cage selected from one of two different cage constructions 3, 3', for guiding and switching a chain on different sprockets at the pedal bearing of the frame R. The parallel guide device P is fastened to the seat tube 1 and has a base B at which the cage is fastened. The frame R is produced using different constructions so that the seat tube 1 is disposed relative to a chain brace 16 at a first angular area α or a second angular area α'. The first and second angular areas α, α' lie between approximately 63° and 69° over a range of approximately 6°. For reasons of optimum shifting, an angle tolerance of only approximately 3° is possible to vary the position of the cage relative to the traction portion. As a result, a selection of one of two different cage constructions for use in the chain switching devices is required depending on the frame construction type.

Figure 2:
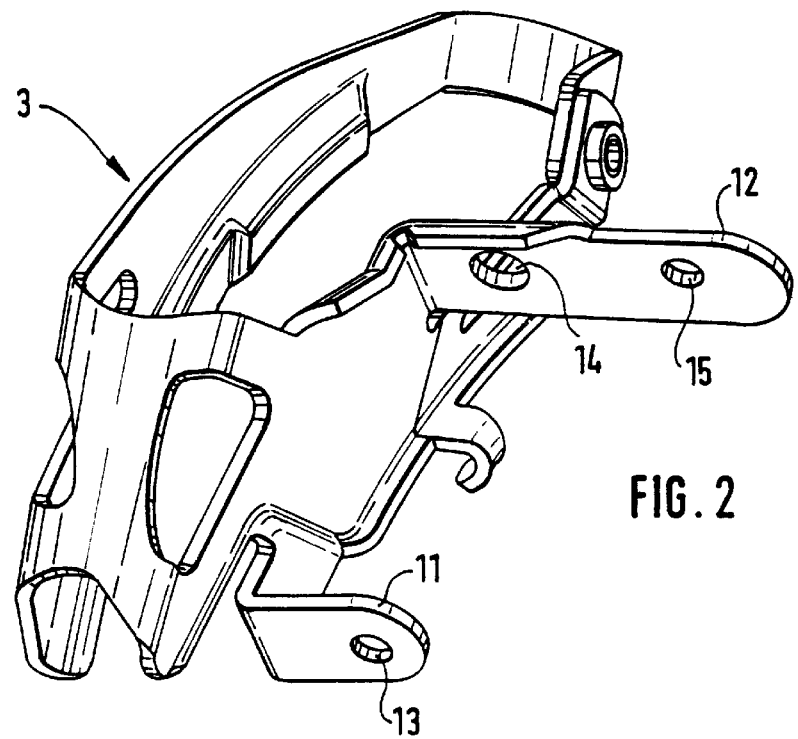
FIG. 2 shows the first cage construction in the chain switching device of FIG. 1 including a first bracket and a second bracket.

FIG. 2 shows the first cage construction 3 suitable for the first angular area of between approximately 66° and 69°. The first cage construction 3 comprises a first bracket 11 with a first joint bore hole 13 defined therein and a second bracket 12 with a second joint bore hole 14 and a guide bore hole 15 defined therein. First and second brackets 11, 12 are angled substantially parallel to one another and separated at a distance from one another which corresponds to the base B. The parallel guide device P is connected to the first and second brackets 11, 12 by parallelogram levers which are arranged so as to be swivelable in the parallel guide device and engage the first and second joint bore holes 13, 14. The guide bore hole 15 is connected to the parallel guide to close the parallelogram rectangle and thereby stabilize the first cage construction 3.

Figure 3:
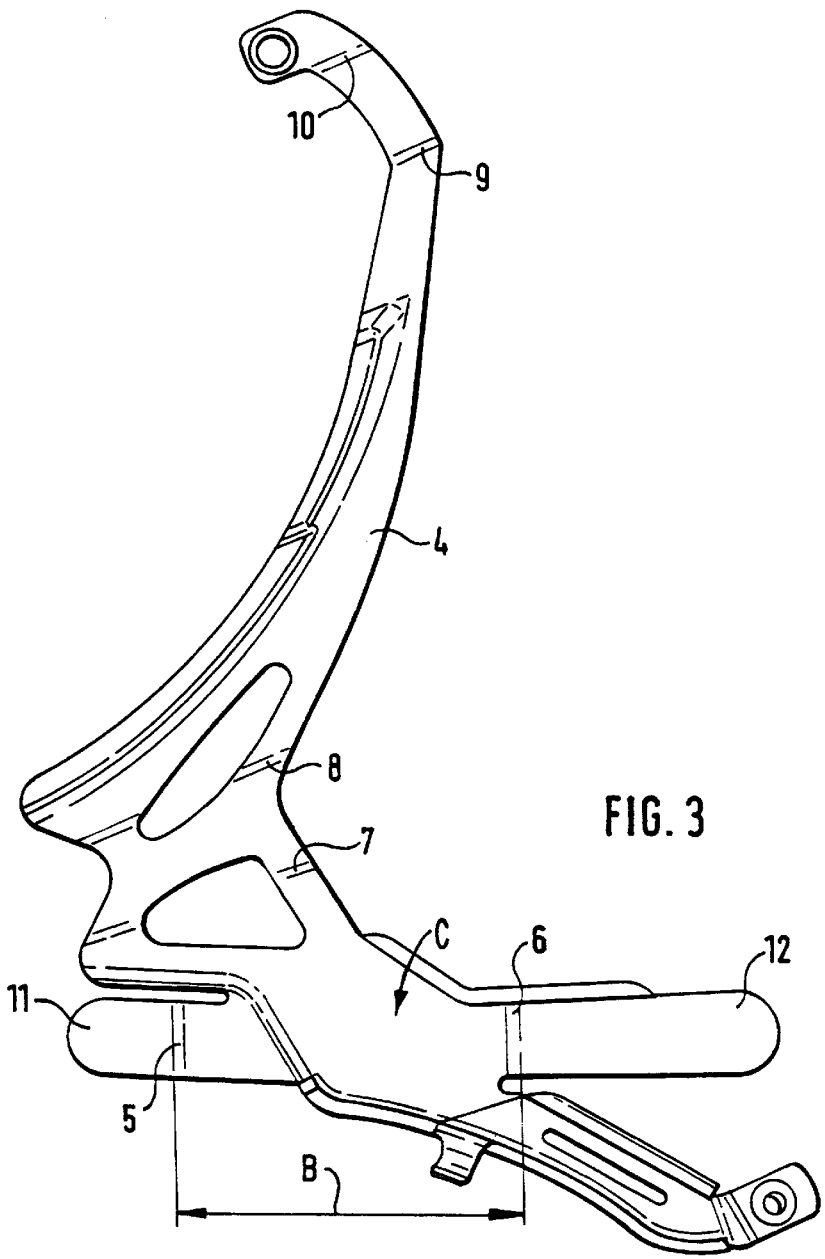
FIG. 3 shows a sheet metal blank for producing the first cage construction in the chain switching device of FIG. 1.
Figure 4:
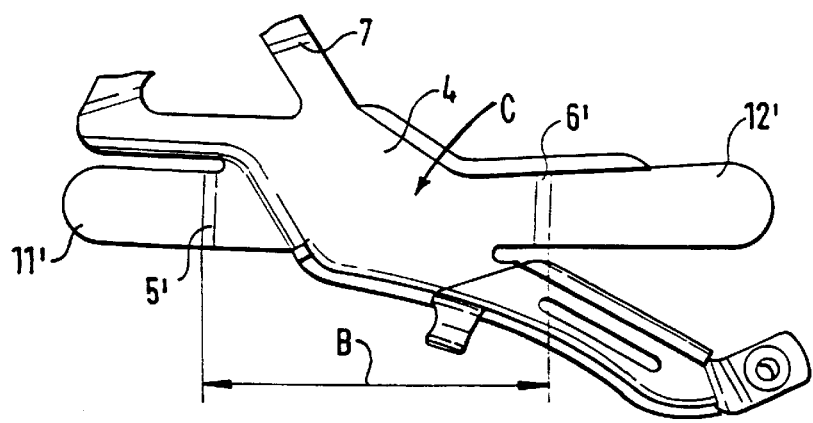
FIG. 4 shows the sheet metal blank of FIG. 3 with modified positions of the bending edges for producing the second cage construction in the chain switching device of FIG. 1.

FIGS. 3 and 4 show a two-dimensional sheet metal blank from which the two different cage constructions can be three-dimensionally shaped. The sheet metal blank 4 is folded approximately 90° at intended bending edges. For example, the first bracket 11, 11' is bent at a first bending edge 5, 5' and the second bracket 12, 12' are bent at a second bending edge 6, 6' resulting in the three-dimensional shape of the first and second brackets 11, 12 as shown in FIG. 2. A third bending edge 7 and a fourth bending edge 8 form an upper portion of the first or second cage constructions 3, 3', while a fifth bending edge 9 and a sixth bending edge 10 form a lower portion of the first or second cage constructions 3, 3'. It is evident from a comparison of FIGS. 4 and 5 that, with the exception of the first bending edges 5, 5' and the second bending edges 6, 6', there is no difference between the sheet metal blanks of the first and second cage constructions 3, 3'. The respective intended bending edges 5, 6 and 5', 6', have a base distance B from one another corresponding to the connecting dimensions of the parallel guide device P. Further, it can be seen from FIGS. 3 and 4 that the first bracket 11 of the first cage construction 3 is shorter in length than the first bracket 11' of the second cage construction 3' because the intended first ending edge 5 is at a greater distance from a center C of the sheet metal blank 4 than the intended first bending edge 5'. Similarly, the second bracket 12 is longer in length than the second bracket 12' in FIG. 4 because the intended second bending edge 6 is arranged closer to the center C of the sheet metal blank 4 than the second intended bending edge 6'. Thus, when the first cage construction 3 is manufactured according to FIG. 3, the brackets 11 and 12 lead brackets 11' and 12' when viewed in the movement direction. This means that the first cage construction 3 which is manufactured from the sheet metal blank 4 according to FIG. 3 when mounted to the seat tube 1 by means of the parallel guide device P lags behind the second cage construction 3' when viewed in the movement direction. Since the seat tube 1 has different angles relative to the chain braces 16 in the frame R within the first or second angular areas α, α', these angles are also formed between the first or second cage construction 3, 3', mounted to the seat tube 1 and the mounted chains which are to be guided therethrough. Thus, it is necessary for the first or second cage constructions 3, 3' to rotate around the center of the sprocket with the changed angles α, α' of the seat tube 1. Since the position of the parallel guide device P remains unchanged, rotation of the cage around the center of the sprocket with the changed angles of the seat tube is possible only by adjusting the bracket position and angle of the intended bending edges 5 and 6 relative to 5' and 6'.

Figure 5:
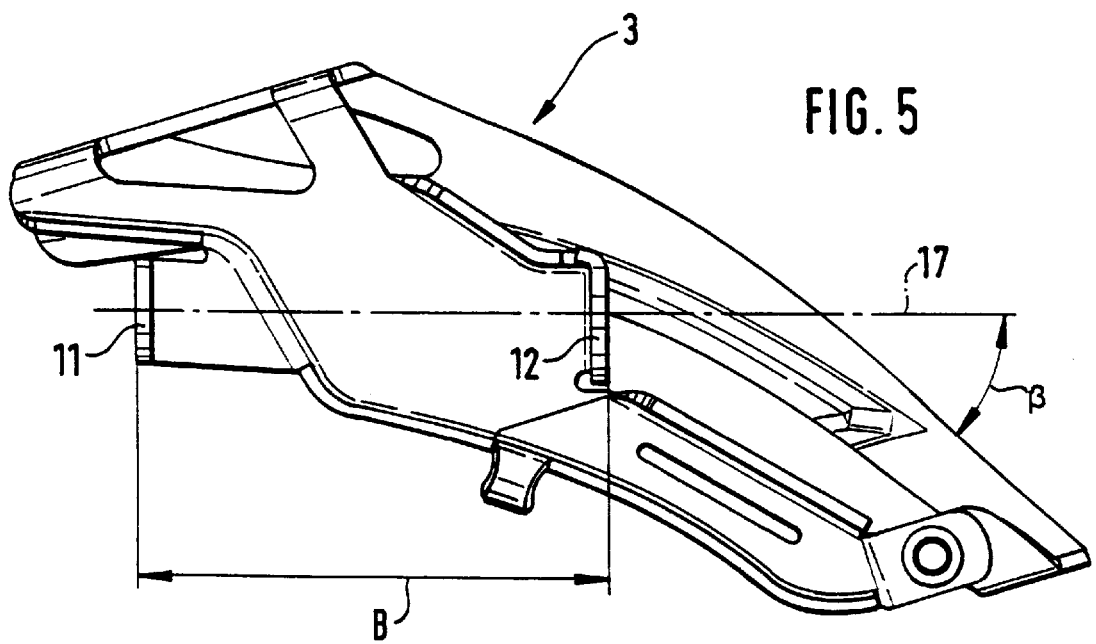
FIG. 5 is a lateral view of the first cage construction of the chain switching device of FIG. 1 with a base formed by the first and second brackets for fastening to the parallel guide device.
Figure 7:
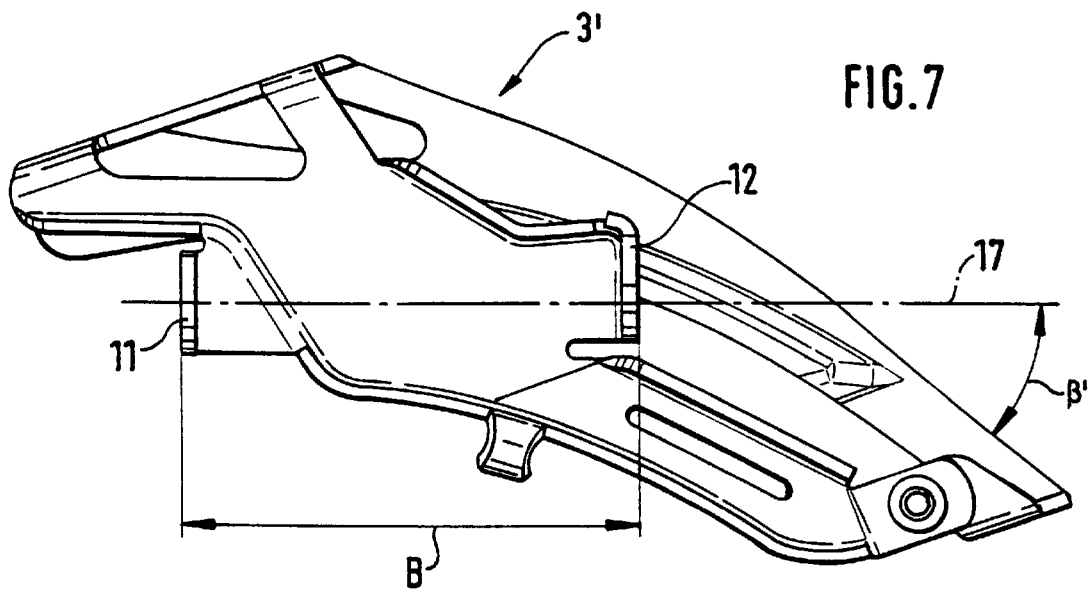
FIG. 7 is a lateral view the second cage construction of the chain switching device of FIG. 1 with a base formed by the first and second brackets for fastening to the parallel guide device.

The construction, just mentioned, of the first bracket 11, 11' and second bracket 12, 12' at the sheet metal blank 4 results in two different cage constructions 3 and 3' as shown in FIGS. 5 and 7. Adjusting angles β, β' are shown relative to a swivel fastening axis 17 through the joint bore holes 13, 13', 14, 14' and through the guide bore holes 15, 15'. The difference between the adjusting angles β and β' corresponds to the difference between the first angular area α and the second angular area α', e.g. approximately 3°.

Figure 6:
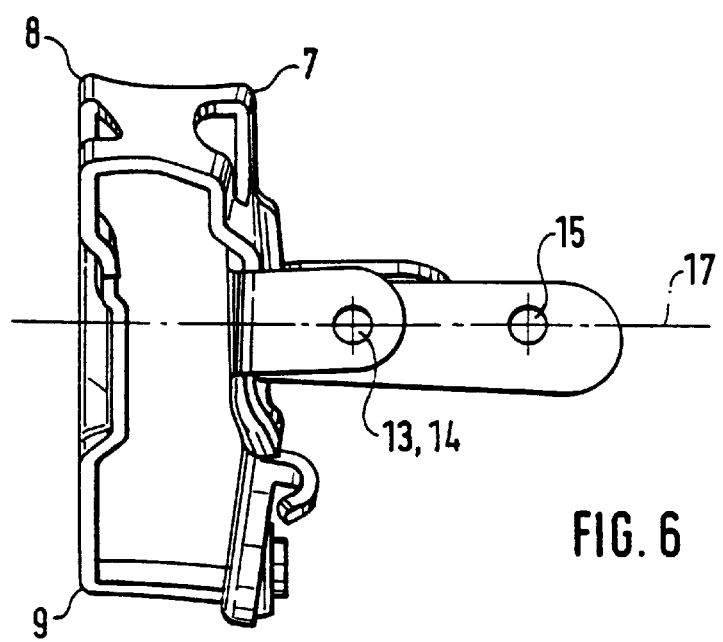
FIG. 6 is a longitudinal view of the first cage construction of FIG. 5.
Figure 8:
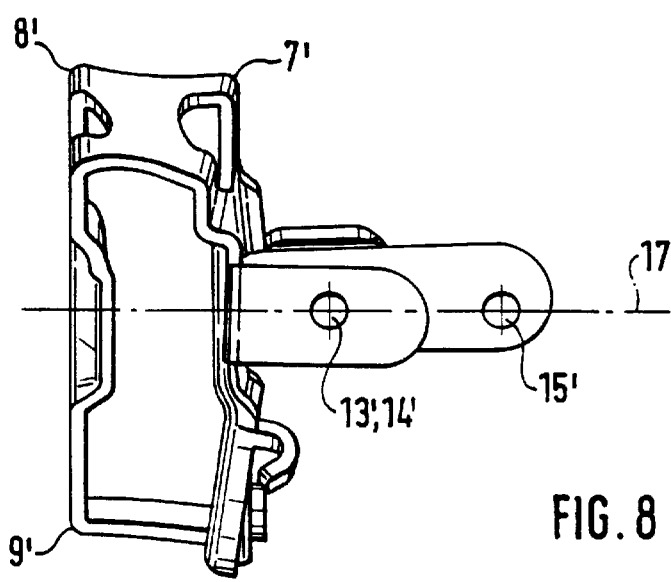
FIG. 8 is a longitudinal view of the second cage construction of FIG. 7.

FIGS. 6 and 8 are longitudinal views of the two different cage constructions shown in FIGS. 5 and 7 so that the swivelably movable fastening of the brackets 11, 12 and 11', 12' at the parallel guide device P is shown in its true magnitude. The joint bore holes 13, 13' and 14, 14' and the guide bore holes 15, 15' form the connection to the parallelogram of the parallel guide device P.

When the position of the first cage construction 3 shown in FIG. 5 is compared to the position of the second cage construction 3' shown in FIG. 7, it is evident that the lead of the first cage construction 3 relative to the base B in the movement direction is less pronounced than that of the second cage construction 3' relative to the base B.

Furthermore, the adjusting angle β of the first cage construction 3 relative to the swivel fastening axis 17 is greater than the adjusting angle β' of the second cage construction 3' relative to swivel fastening axis 17.

When a frame R with a first angular area α between the chain brace 16 and the seat tube 1 is provided with a chain switching device, then, since the angular area α is the greater angular area, a first cage construction 3 must be mounted which lags behind its base B and which has, in addition, a greater adjusting angle β. If the seat tube with a smaller second angular area α' is provided with a chain switching device, the second cage construction 3' must lead the base B by the amount by which the seat tube 1 is turned back and must at the same time be rotated forward by a difference between the adjusting angles β and β'.

In order to achieve the two conditions mentioned above, it is necessary to arrange the first bending edge 5 relative to the first bending edge 5' not only at different positions of the first bracket 11 and the first bracket 11', respectively, but also to rotate it by the difference between the angular areas α and α'. The differences between the two brackets 12 and 12' are same as those shown in the comparison of FIGS. 3 and 4. The different angles at which the first bracket 11 and the second bracket 12 are bent relative to the first bracket 11' and second bracket 12' result in different positions and lengths of the first bracket 11 relative to the first bracket 11' and of the second bracket 12 relative to the second bracket 12' as shown in FIGS. 6 and 8.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A device for switching a chain on different sprockets of a pedal bearing mounted to a seat tube of bicycle frames having a chain brace, said device being mountable on different bicycle frames wherein the seat tube is disposed relative to said chain brace at one of a first angular area and a second angular area with a difference between said first angular area and said second angular area of up to 6°, said device comprising:

a parallel guide device having a base;

a cage swivelably mounted to said parallel guide device about a fastening axis for guiding and switching the chain, said cage being formed from a single sheet metal blank having a center and said cage having a cage construction selected from the group consisting of a first cage construction and a second cage construction, wherein said first cage construction is disposed at a first adjusting angle relative to the fastening axis for the first angular area and said second cage construction is disposed at a second adjusting angle relative to the fastening axis for the second angular area, said cage including a first bracket having a first joint bore hole defined therein and a second bracket having a second joint bore hole and a guide bore hole defined therein, wherein said first and second cage constructions respectively optimize positioning of said cage relative to a traction portion of the chain over the first and second angular areas;

wherein each of said first and second brackets comprises one of first and second bending edges, said first bending edges being used for said first cage construction and said second bending edges being used for said second cage construction; and wherein a difference between said first adjusting angle of said first cage construction and said second adjusting angle of said second cage construction is equal to the difference between the first angular area and the second angular area.

2. The device in accordance with claim 1, wherein said first adjusting angle of said first cage construction relative to said second adjusting angle of said second cage construction is an angular difference of approximately 3°.

3. The device in accordance with claim 1, wherein said second bending edge of said first bracket is displaced relative to said first bending edge of said first bracket toward the center of the sheet metal blank and said second bending edge of said second bracket is displaced relative to said first bending edge of said second bracket away from the center of the sheet metal blank such that said second cage construction is displaced in a movement direction relative to the base.

4. The device in accordance with claim 1, wherein for each of said first and second cage constructions, said first joint bore hole in said first bracket is axially aligned with said second joint bore hole in said second bracket, and for both said first and second cage constructions said second joint bore hole is displaced relative to said second bracket by a constant distance.

5. The device in accordance with claim 1, wherein the first angular area is within the range including 66° to 69° and the second angular area is within the range including 63° to 66°.

* * * * *